United States Patent [19]

MacPhail

[11] Patent Number: 5,107,419
[45] Date of Patent: Apr. 21, 1992

[54] METHOD OF ASSIGNING RETENTION AND DELETION CRITERIA TO ELECTRONIC DOCUMENTS STORED IN AN INTERACTIVE INFORMATION HANDLING SYSTEM

[75] Inventor: Margaret G. MacPhail, Austin, Tex.

[73] Assignee: International Business Machines Corporation, Armonk, N.Y.

[21] Appl. No.: 138,535

[22] Filed: Dec. 23, 1987

[51] Int. Cl.$^5$ .............................................. G06F 15/40
[52] U.S. Cl. .................................. 395/600; 364/282.1; 364/283.3; 364/188; 364/DIG. 1; 395/148
[58] Field of Search ... 364/200 MS File, 900 MS File

[56] References Cited

U.S. PATENT DOCUMENTS

| | | | |
|---|---|---|---|
| 4,142,234 | 2/1989 | Bean et al. | 364/200 |
| 4,578,766 | 3/1986 | Caddy | 364/521 |
| 4,658,351 | 4/1987 | Teng | 364/200 |
| 4,679,137 | 7/1987 | Lane et al. | 364/188 |
| 4,730,252 | 3/1988 | Bradshaw | 364/403 |
| 4,758,956 | 7/1988 | Duffy | 364/422 |
| 4,785,399 | 11/1988 | Evans et al. | 364/300 |
| 4,791,281 | 12/1988 | Johnsen et al. | 235/383 |
| 4,805,089 | 2/1989 | Lane et al. | 364/188 |
| 4,807,154 | 2/1989 | Scully et al. | 364/518 |
| 4,807,155 | 2/1989 | Cree et al. | 364/518 |
| 4,817,018 | 3/1989 | Cree et al. | 364/518 |
| 4,823,310 | 4/1989 | Grand | 364/900 |
| 4,843,538 | 6/1989 | Lane et al. | 364/188 |
| 4,849,883 | 7/1989 | Mitchell et al. | 364/300 |
| 4,873,623 | 10/1989 | Lane et al. | 364/188 |
| 4,939,668 | 7/1990 | Brown et al. | 364/513 |
| 4,974,149 | 11/1990 | Valenti | 364/200 |
| 4,985,855 | 1/1991 | Aldrich et al. | 364/522 |

*Primary Examiner*—Gareth D. Shaw
*Assistant Examiner*—Maria N. Von Buhr
*Attorney, Agent, or Firm*—Richard E. Cummins

[57] ABSTRACT

A method for automatically completing the entry of the retention and deletion criteria employed by an interactive information handling system to manage the automatic retention and deletion of a relatively large number of electronic documents that are stored in the system by a plurality of end users. The method provides a screen image on a display device in response to the end user advising the system that he wants to assign retention and deletion information to an electronic document. The screen image prompts the end user for a set of required criteria and allows the interactive entry of one or more criteria by the end user directly. The remaining criteria that are not entered directly by the end user are entered automatically based on a logical analysis by said system involving the identity of the criteria that was entered directly and pre-established information stored in said system. The criteria include a document label, an ownership label, a document expiration date and an ownership expiration data. Information involved in the automatic entry process includes allowable document and ownership labels personalized for each end user and allowable expiration dates or ranges for each label. Also stored are rules that allow a logical analysis to select a default criteria and to verify and information that was entered directly by the end user.

10 Claims, 12 Drawing Sheets

| SELECT ACTION FOR DOCUMENT | |
|---|---|
| | COPY |
| | UPDATE CONTENT |
| | SET DESCRIPTORS |
| x | FILE |
| | MAIL |
| | DELETE |

FIG. 4c

| SET DOCUMENT DISCRIPTORS MENU |
|---|
| DOCUMENT NAME: |
| SUBJECT: |
| DOCUMENT LABEL: MEMO |
| DOCUMENT EXPIRATION DATE: 12/10/87 |
| OWNERSHIP LABEL: <u>PERSONAL MEMO</u> |
| OWNERSHIP EXPIRATION DATE: 10/10/87 |
| NOTE:<br>    TO SEE A LIST OF ALLOWABLE VALUES, PLACE THE CURSOR UNDER<br>    THE FIELD AND PRESS HELP |
| TO EXIT THIS MENU, PRESS ENTER. |

FIG. 5

| ALLOWABLE DOCUMENT LABELS FOR MARY | | |
|---|---|---|
| DOCUMENT LABEL | DESCRIPTION | RANGE OF DOCUMENT EXPIRATION DATES |
| BUDGET | FINANCE PLAN | 8/20/90-8/20/99 |
| MEMO | QUICK NOTE | 8/20/87-9/20/87 |
| WORK STATUS | STATUS REPORT | 8/20/87-8/20/90 |
| WORK PLAN | WORK SCHEDULE | 8/20/87-8/20/90 |
| BUDGET DATA | EXPENSES | 8/20/90-8/20/99 |

NOTE:

PLACE CURSOR UNDER DESIRED LABEL AND PRESS ENTER.

FIG. 6

| ALLOWABLE OWNERSHIP LABELS FOR MARY WHEN DOCUMENT LABEL = BUDGET | | |
|---|---|---|
| OWNERSHIP LABEL | DESCRIPTION | RANGE OF OWNERSHIP EXPIRATION DATES |
| DEPT BUDGET | LOCAL USE | 8/20/87-8/20/92 |
| AREA BUDGET | AREA USE | 8/20/87-9/20/99 |
| PERSONAL BUDGET | MY OWN USE | 8/20/87-8/20/90 |
| BIG BUDGET | AREA USE | 8/20/87-8/20/99 |

NOTE:

PLACE CURSOR UNDER DESIRED LABEL AND PRESS ENTER.

FIG. 7

| USER PROFILE FOR MARY - OWNERSHIP LABEL SECTION ||||
|---|---|---|---|
| INPUT LABEL | OUTPUT LABEL | DESCRIPTION | DEFAULT DOCUMENT LABEL |
| AREA BUDGET | BIG BUDGET | AREA USE | BUDGET |
| MEMO | AREA MEMO | NOTE TO AREA | MEMO |
| BIG BUDGET | BIG BUDGET | AREA USE | BUDGET |
| BUDGET DATA | BUDGET DATA | EXPENSES | BUDGET DATA |
| DEPT BUDGET | DEPT BUDGET | LOCAL USE | BUDGET |
| DEPT MEMO | DEPT MEMO | NOTE TO DEPT | MEMO |
| PERSONAL BUDGET | PERSONAL BUDGET | MY OWN USE | BUDGET |
| PERSONAL MEMO | PERSONAL MEMO | QUICK NOTE | MEMO |
| WORK STATUS | WORK STATUS | STATUS REPORT | WORK STATUS |
| WORK PLAN | WORK PLAN | WORK SCHEDULE | WORK PLAN |
| "OTHER" | PERSONAL MEMO | UNKNOWN LABEL | MEMO |
| "NONE:" | PERSONAL MEMO | NO LABEL | MEMO |

FIG. 8

| USER PROFILE FOR MARY - DOCUMENT LABEL SECTION ||||
|---|---|---|---|
| INPUT LABEL | OUTPUT LABEL | DESCRIPTION | DEFAULT OWNERSHIP LABEL |
| BUDGET | BUDGET | FINANCIAL | BIG BUDGET |
| MEMO | MEMO | QUICK NOTE | MEMO |
| WORK STATUS | WORK STATUS | STATUS REPORT | WORK STATUS |
| WORK PLAN | WORK PLAN | WORK SCHEDULE | WORK PLAN |
| "OTHER" | MEMO | UNKNOWN LABEL | PERSONAL MEMO |
| "NONE" | SEE OWNERSHIP | NO LABEL | SEE OWNERSHIP |

FIG. 9

| OWNERSHIP EXPIRATION DATE VALUES | | | | |
|---|---|---|---|---|
| OUTPUT OWNERSHIP LABEL | MINIMUM PERIOD | MAXIMUM PERIOD | PERMISSIBLE VALUES | DEFAULT VALUE |
| AREA MEMO | 1 DAY | 1 YEAR | ANY IN RANGE | 1 MONTH |
| BIG BUDGET | 1 MONTH | 15 YEARS | ANY IN RANGE | 1 YEAR |
| DEPT BUDGET | 1 MONTH | 5 YEARS | ANY IN RANGE | 1 YEAR |
| DEPT MEMO | 1 DAY | 1 YEAR | ANY IN RANGE | 1 MONTH |
| PERSONAL BUDGET | 1 YEAR | 5 YEARS | 5 YEARS | NONE |
| PERSONAL MEMO | 1 MONTH | 1 YEAR | ANY IN RANGE | 1 MONTH |
| WORK STATUS | 1 MONTH | 5 YEARS | ANY IN RANGE | 1 YEAR |
| WORK PLAN | 1 MONTH | 5 YEARS | ANY IN RANGE | 1 YEAR |

FIG. 10

| DOCUMENT EXPIRATION DATE VALUES | | | | |
|---|---|---|---|---|
| OUTPUT DOCUMENT LABEL | MINIMUM PERIOD | MAXIMUM PERIOD | PERMISSIBLE VALUES | DEFAULT VALUE |
| MEMO | 1 DAY | 1 YEAR | ANY IN RANGE | 1 MONTH |
| BUDGET | 1 MONTH | 15 YEARS | ANY IN RANGE | 1 YEAR |
| WORK STATUS | 1 MONTH | 5 YEARS | ANY IN RANGE | 1 YEAR |
| WORK PLAN | 1 MONTH | 5 YEARS | ANY IN RANGE | 1 YEAR |

FIG. 11

| EXPIRATION DATE CALCULATION RULES | |
|---|---|
| OUTPUT OWNERSHIP LABEL | RULE FOR CALCULATING EXPIRATION DATES |
| AREA MEMO | OWNERSHIP EXPIRATION = DOCUMENT EXPIRATION DATE |
| BIG BUDGET | OWNERSHIP EXPIRATION LE DOCUMENT EXPIRATION DATE |
| DEPT BUDGET | OWNERSHIP EXPIRATION LE DOCUMENT EXPIRATION DATE |
| DEPT MEMO | OWNERSHIP EXPIRATION LE DOCUMENT EXPIRATION DATE |
| PERSONAL BUDGET | OWNERSHIP EXPIRATION IND DOCUMENT EXPIRATION DATE |
| PERSONAL MEMO | OWNERSHIP EXPIRATION = DOCUMENT EXPIRATION DATE |
| WORK STATUS | OWNERSHIP EXPIRATION LE DOCUMENT EXPIRATION DATE |
| WORK PLAN | OWNERSHIP EXPIRATION IND DOCUMENT EXPIRATION DATE |

FIG. 12a

| EXPIRATION DATE CALCULATION RULES | |
|---|---|
| OUTPUT DOCUMENT LABEL | RULE FOR CALCULATING EXPIRATION DATES |
| MEMO | OWNERSHIP EXPIRATION = DOCUMENT EXPIRATION DATE |
| BUDGET | OWNERSHIP EXPIRATION LE DOCUMENT EXPIRATION DATE |
| WORK STATUS | OWNERSHIP EXPIRATION LE DOCUMENT EXPIRATION DATE |
| WORK PLAN | OWNERSHIP EXPIRATION IND DOCUMENT EXPIRATION DATE |

FIG. 12b

| OWNERSHIP LABEL | | | |
|---|---|---|---|
| INPUT OWNERSHIP LABEL MATCHES IN USER PROFILE | INPUT DOCUMENT LABEL MATCHES IN USER PROFILE | DEFAULT OWNERSHIP LABEL FOR THIS DOCUMENT LABEL | RESULT |
| YES | - | - | OUTPUT OWNERSHIP LABEL FROM INPUT OWNER LABEL ENTRY |
| NO | YES | YES | OUTPUT OWNERSHIP LABEL FROM INPUT DOCUMENT ENTRY |
| NO | YES | NO | NO OUTPUT OWNERSHIP LABEL |
| NO | NO | NA | NO OUTPUT OWNERSHIP LABEL |

NOTE:
    NA = NOT APPLICABLE

FIG. 13a

| DOCUMENT LABEL | | | |
|---|---|---|---|
| INPUT DOCUMENT LABEL MATCHES IN USER PROFILE | INPUT OWNERSHIP LABEL MATCHES IN USER PROFILE | DEFAULT DOCUMENT LABEL FOR THIS OWNERSHIP LABEL | RESULT |
| YES | - | - | OUTPUT DOCUMENT LABEL FROM INPUT DOC LABEL ENTRY |
| NO | YES | YES | OUTPUT DOCUMENT LABEL FROM INPUT OWNERSHIP ENTRY |
| NO | YES | NO | NO OUTPUT DOCUMENT LABEL |
| NO | NO | NA | NO OUTPUT DOCUMENT LABEL |

NOTE:
    NA = NOT APPLICABLE

FIG. 13b

| OWNERSHIP EXPRIATION DATE ||||
|---|---|---|---|
| INPUT OWNERSHIP EXPIRATION DATE | OWNERSHIP LABEL SET | DEFAULT DATE FOR THIS OWNERSHIP LABEL | RESULT |
| YES | - | - | OUTPUT DATE = INPUT DATE |
| NO | YES | YES | OUTPUT DATE = DEFAULT FROM OWNERSHIP ENTRY |
| NO | YES | NO | NO OUTPUT DATE |
| NO | NO | NA | NO DATE |

FIG. 13c

| DOCUMENT EXPIRATION DATE ||||
|---|---|---|---|
| INPUT DOCUMENT EXPIRATION DATE | DOCUMENT LABEL SET AND DEFAULT DOC EXP DATE | OWNERSHIP LABEL SET AND DEFAULT DOC EXP DATE | RESULT |
| YES | - | - | OUTPUT DATE = INPUT DATE |
| NO | YES | - | OUTPUT DATE = DEFAULT FROM DOCUMENT LABEL ENTRY |
| NO | NO | YES | OUTPUT DATE = DEFAULT FROM OWNERSHIP LABEL ENTRY |
| NO | NO | NO | NO OUTPUT DATE |

FIG. 13d

METHOD OF ASSIGNING RETENTION AND DELETION CRITERIA TO ELECTRONIC DOCUMENTS STORED IN AN INTERACTIVE INFORMATION HANDLING SYSTEM

FIELD OF INVENTION

This invention relates in general to methods for classifying electronic documents in an interactive information handling system and in particular to a method of classifying documents which insures that descriptors established for managing the retention and deletion of stored documents are correctly applied to the document when the document is filed in the system.

CROSS-REFERRENCED APPLICATIONS

U.S. application Ser. No. 07/138,231 entitled "A Method for Managing the Retention of Electronic Documents in an Interactive Information Handling System" filed concurrently herewith in the name of M. G. MacPhail, is directed to a method of automatically managing the retention and deletion of stored documents in which the criteria for determining which documents are retained and which documents are deleted is based on first and second expiration dates which reflect different considerations and which are controlled by different entities.

BACKGROUND ART

The prior art has disclosed various interactive information handling systems which store electronic documents. These systems vary in complexity and sophistication from the very simple personal computer employed in the home for writing letters to the very large main frame data processing systems in which thousands of users nodes interact with each other and with a centralized library or file of information. An example of a sophisticated system that is currently in use by several large governmental agencies and private corporations is the systems referred to as PROFS that is marketed by the IBM Corporation. These types of systems store and manage millions of documents ranging from one page memos and messages to multi-page reports that might involve several printed volumes. In many of these systems, the need for hard copy no longer exists, so the only copy of the information is the originally generated electronic copy.

The management and control of the paper flow in any large enterprise, be it a governmental agency or a private corporation, requires a set of procedures which define how various types of communications or documents are to be handled. This is a necessity in both manually implemented systems which deal in nothing but hard copy as well as electronically implemented systems that deal only with electronic copies.

It is generally recognized by both types of systems, that there are two basic document control strategies that must be enforced in order to have an effective and efficient system. The first is that documents that are no longer needed should be deleted from the system as soon as possible and the second is that a document that is required should be maintained as long as it is needed by the document owner or the enterprise.

It is obvious that in implementing these two basic concepts it is not always possible to obtain an agreement, much less a consensus, on such items as to who makes the decision to keep or delete a document, does this decision apply to all document types or does it change with the type of document, can there be exceptions and changes in the criteria, who determines the time period for document types, etc.

The prior art systems that involve a large number of users who create electronic documents that are stored in the system at a logically centralized location, do generally impose a number of structured formatting constraints on the manner by which documents are identified in the system. In most systems, some type of manual document classification system is established, either on a formal basis or a de facto basis. A bank might use a functional business classification for documents. For example a customer's loan folder might include a "loan application", a "credit history", a "payment history" etc. These various documents have different retention requirements and there is generally no provision made to permit any deviations from the established retention criteria. In prior art system, a search is performed on a specific term contained in a plurality of documents and documents are deleted based thereon. The term may have a different meaning within each of the documents. Thus, this form of document management may result in the deletion of document which should be retained or the omission of documents which do not contain the term and should be deleted.

A batch type of approach to document retention, where the date to delete the document is controlled by the enterprise, creates a problem when the date has to be changed. If the date that the document is to be deleted is shortened, there are undoubtedly some persons who are relying on the fact that the document is to be available up to the previously established date. How does the system administrator evaluate whether these documents can be destroyed. If the documents are deleted there is likely to be some direct adverse consequence to those persons who were relying on the document for their work. A more serious long term consequence however results when documents are destroyed early, in that there is a loss of integrity of the system which soon results in users operating their own backup document storage system which defeats the many advantages of a centralized system.

It is therefore important in electronic document storage systems to provide the user with as much flexibility as possible in as many areas as possible. The problem of providing flexibility to the user however almost always adds to the complexity of the process and requires the user to obtain and retain an understanding of all the various options available and the nuances of their differences. It is extremely important to have the data that is used to manage the retention and deletion of the documents, entered correctly into the system. The data entry process for the end user of the system must therefore be simple to use, yet permit a more sophisticated user to take advantage of the more advance features. The data entry process must also be fail safe to insure that only valid descriptors are entered into the system.

The present invention is directed to an improved method for use in an interactive information handling system in which the data entry process for the descriptors that are used in the retention and deletion of documents is simple, flexible, and fail safe, and therefore avoids many of the problems that occur with the prior art document storage systems.

SUMMARY OF THE INVENTION

The method of the present invention is advantageously employed is the arrangement disclosed in the cross-referenced application Ser. No. 07/138,231. That arrangement involves a recognition of the respective document retention needs of the document owners and the document retention criteria of the enterprise that functions as the central administration of the system, by establishing a dual label for each document that is to be stored in the system. The first label is referred to as the Document Label (DL) and functions, for example, to identify the business use classification of the document. The second label is referred to as the Ownership Label (OL) and functions to identify a document classification assigned by the owner, which in most situations is the author.

A separate expiration date is associated with each of the two labels. The ownership expiration date is set by the owner to indicate the length of time that he desires ownership of the document. Ownership implies the authority and responsibility for the document during the ownership period. A System Administrator (SA) for example establishes the range of expiration dates for each user for each of the document labels.

Each document filed in the system has associated with it the label and expiration date criteria that are employed to automatically manage the retention and deletion of documents from the system.

When a document is to be filed by the system, the retention and deletion selection criteria must be entered into the system and stored in the system at the same time as the document. The information is entered into the system interactively by the end user. A series of prompts is presented on the screen of a display device by the system in response to the user selecting an option presented on a menu screen. The amount of data entered in response to the prompt can very depending on the user and other considerations. Valid document labels are preferably preestablished by the System Administrator (SA). Valid ownership labels for each end user are also preestablished by the end user and the SA. A profile is established for each end user which includes several different tables. One table functions to provide a default document label descriptor which is selected in accordance with an input ownership label descriptor that was entered manually. If the end user did not enter a document label, the method provides the preestablished default. If a document label is entered manually by the end user, the correctness of the document label is verified by the method. Other tables provide default ownership labels for user entered document labels; default ownership expiration dates for ownership labels, and default document dates for document labels. Associated with each table is a set of default rules which cover the various permutations that might occur with the input entry data and dictate a consistent result for the same input data each time.

The end user may override a default document expiration date with a valid alternate date. The document owner can establish a range of allowable expiration dates for each ownership label which can be entered automatically when the ownership label is entered. The end user may also override a default document ownership date with a valid alternate date. The document owner can establish a range of allowable ownership dates for each ownership label which can be entered automatically when the ownership label is entered.

Documents are automatically retained and deleted by processing the expiration date criteria associated with each document relative to a current date according to the method of the cross-referenced application.

It is therefore an object of the present invention to provide an improved method for storing electronic documents.

Another object of the present invention is to provide an improved method for entering criteria into an electronic document storage system that is used in managing the retention of the stored electronic documents.

A further object of the present invention is to provide an improved method for automatically entering retention and deletion criteria for stored electronic documents.

A still further object of the present invention is to provide an improved method to automatically enter and verify criteria that are employed by an electronic document storage system to manage the retention and deletion of documents in the system.

A still further object of the present invention is to insure the integrity and validity of retention and deletion criteria that is entered into an electronic document storage system.

Object and advantages other than those mentioned above will become apparent from the following description when read in connection with the drawing.

BRIEF DESCRIPTION OF THE DRAWING

FIGS. 4a, 4b and 4c illustrate screens for the main action menu, the sub-action menu for a document, and the select action for document menu, referred to in FIG. 3b.

FIG. 5 illustrates the screen that is presented to the end user at the time a document is to be filed in the system.

FIG. 6 illustrates the screen that is presented to a designated end user when a list of allowable document labels is requested.

FIG. 7 illustrates the screen that is presented to a designated end user when a list of allowable ownership labels is requested.

FIG. 8 illustrates the ownership label section of a user's profile.

FIG. 9 illustrates the document label section of a user's profile.

FIG. 10 illustrates the ownership expiration date table for a user profile.

FIG. 11 illustrates the document expiration date table for a user profile.

FIGS. 12a and 12b illustrate tables of expiration date calculation rules for a user profile.

FIGS. 13a through 13d illustrate tables of default rules for the document retention criteria rules.

DESCRIPTION OF THE PREFERRED EMBODIMENT

Figure 1:
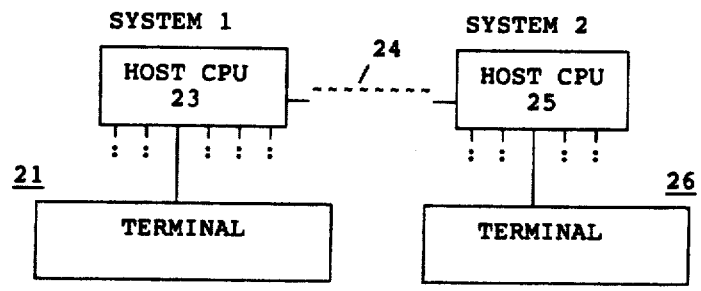
FIG. 1 is a block diagram of an information handling system in which the method of the present invention may be advantageously employed.
Figure 2:
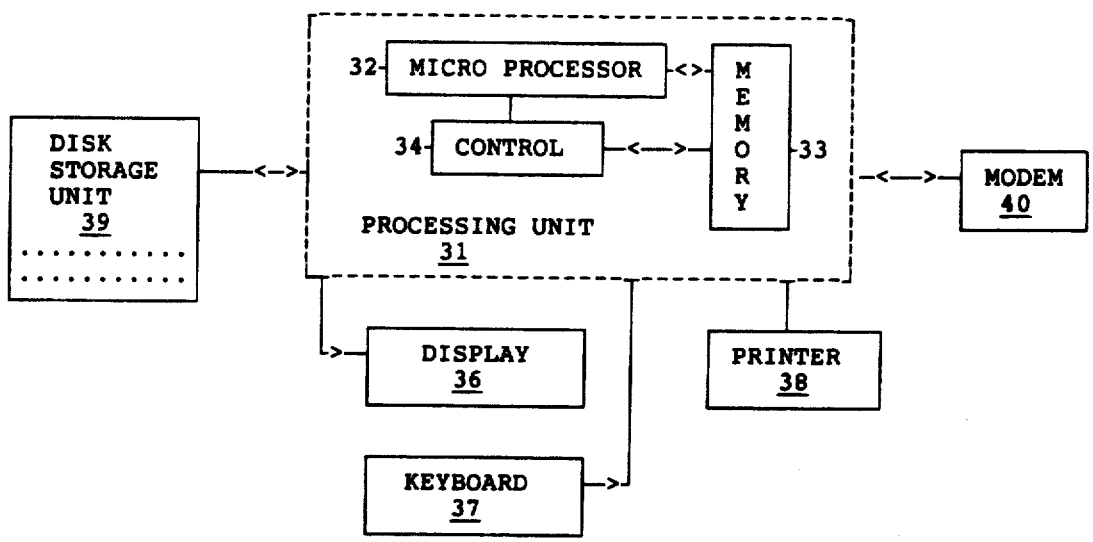
FIG. 2 is a block diagram of one of the interactive terminals employed by a user in the system of FIG. 1.

FIG. 1 illustrates an information handling system comprising a network of interactive type terminals or workstations of the type shown in detail in FIG. 2. As illustrated, the network includes a plurality of terminals 21 which are interconnected with each other and to a host central processing unit 23. As shown in FIG. 1 host 23 in turn is connected via communication link 24 to a second host processing unit 25, which also connects to another network 26 of interactive workstations. Functionally, the system operates to allow each terminal to communicate with the host and to one or more other terminals using established communication protocols, so that the various serially connected communication links are transparent to the users. A user at one terminal can generate a document such as a letter and send that letter to the addressee at a designated node on the network. The user can then store the document in the system at some logically central system location. Each user of the system has the theoretical capability of retrieving that document at a later time. Such systems are well known in the art, and are currently in extensive commercial use. Since the general organization and operations of such systems is well known, only those details that are necessary for an understanding of the document storage method of the present invention will be described. It should therefore be assumed in the following description, that each workstation on the network has a system node address and a "post office" address, and that to simplify the description, there is only one individual assigned to each node on the network. It should further be assumed that conventional communication services are provided by the system, such as directory listings of individual users or owners etc. It may also be assumed that the system shown in FIG. 1 processes information as various types of data objects such as text data objects, graphic data objects, and calendar data objects etc.

FIG. 2 illustrates the functional components of one of the interactive type data processing terminals shown in FIG. 1. The terminal comprises a processing unit 31 which includes a microprocessor block 32, a semiconductor memory 33, and a control block 34 which functions to control input/output operations in addition to the interaction between the micro processor block 32 and the memory unit 33.

The terminal further includes a group of conventional peripheral units including a display device 36, a keyboard 37, a printer 38, a disk storage unit 39, and a modem 40. Since the details of the above described functional blocks form no part of the present invention and can be found in the prior art, only a brief functional description of each block is set forth, along with a description of their interactions, sufficient to provide a person of ordinary skill in the art with a basis of understanding applicants' improved electronic document storage method.

Processing unit 31 corresponds for example to the "system unit" of a personal computer system such as the IBM XT, IBM AT or an IBM PS/2 system. Unit 31 is provided with an operating system program which may be one of the many versions of DOS (Disk Operating System) which is normally employed to run the systems. The operating system program is stored in memory 33 along with one or more application programs that the user has selected to run. Depending on the capacity of memory 33 and the size of the application programs, portions of these programs, as needed, may be transferred to memory 33 from the disk storage unit 39 which may include, for example, a 30 megabtye hard disk drive and a diskette drive. The basic function of the disk storage unit is to store programs and data that are employed by the system and which may readily be transferred to the memory unit 33 when needed. The function of the diskette drive is to provide a removable storage function for entering programs and data into the system, and a vehicle for storing data in a form that is readily transportable for use on other terminals or systems.

Display device 36 and keyboard 37 together provide for the interactive nature of the terminal, in that in normal operation, the interpretation that the system gives to a specific keystroke by the operator depends, in substantially all situations, on what is being displayed to the operator at that point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

The terminal shown in FIG. 2 further includes a printer 38, which functions to provide hard copy output of data developed or stored in the system at some central location. Lastly, the modem 40 functions to transfer data from the terminal of FIG. 2 to a host system through one or more communication links which may be a commercial type link or a dedicated communication link.

Figure 3A:
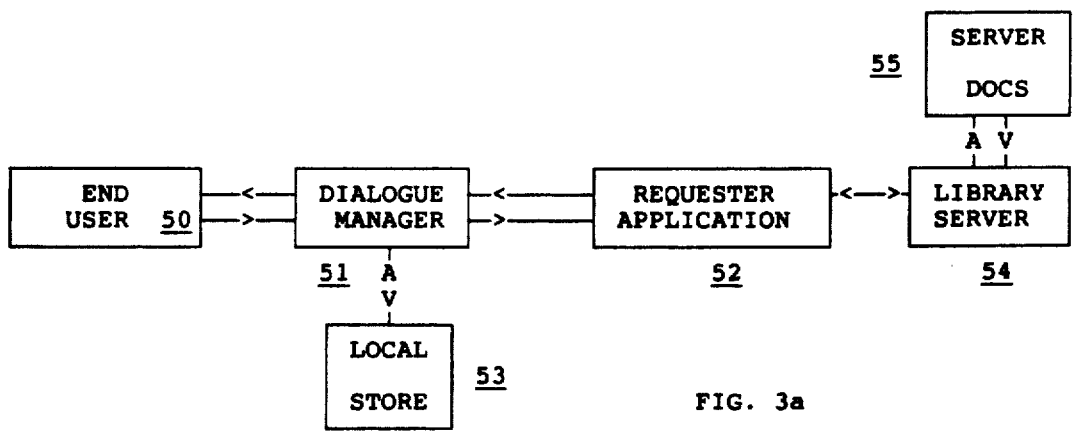
FIGS. 3a and 3b illustrate an overview of the document generation and storage process.
Figure 3B:
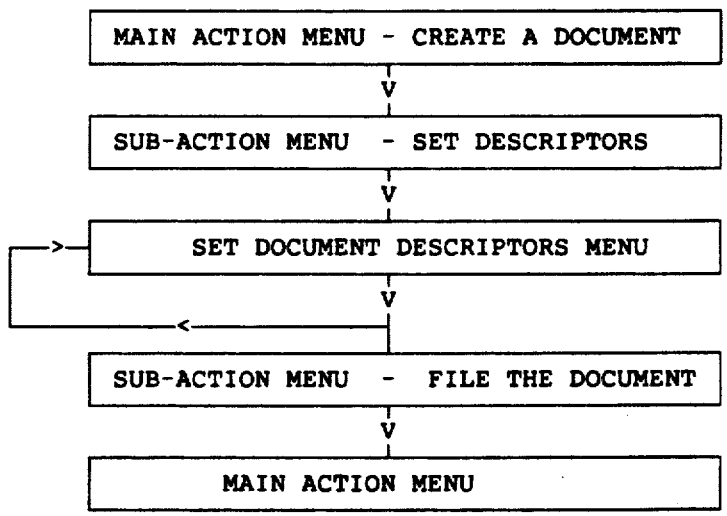

FIG. 3a represents an overview of the system from the standpoint of the major interactive steps involved in storing a document that has been created by an End User (EU). Block 50 represents the EU. Blocks 51 and 52 represent programs stored at the terminal while block 53 represents local disk storage. Blocks 54 and 55 represent the library server function located at the host and is the central depository for stored system documents. The program represented by block 51 is referred to as the Dialogue Manager application and functions to provide the necessary menus and prompts to obtain information from the user. It is essentially the interface to the user from the terminal. The program represented by block 52 is referred to as the requester application and functions to build requests and send them to the library server. The function of the library server is to validate/set labels and expiration dates and to file the document. The flow chart of FIG. 3b shows the major steps of first creating a document; second selecting the sub-action menu in order to set the document descriptors; thirdly setting the actual descriptors in the set document descriptor menu; and lastly filing the document.

Figure 4A:
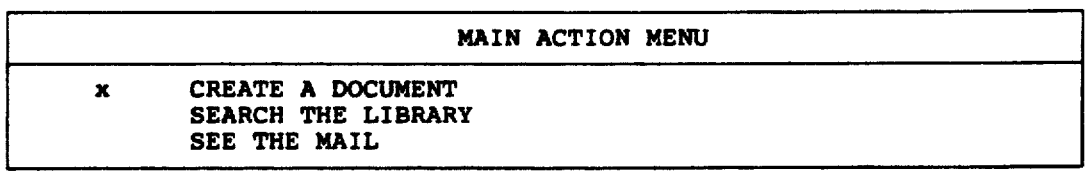

The main action menu is shown in FIG. 4a. As shown, the menu illustrates three separate actions that the EU can designate. The screen cursor is represented by an X in FIG. 4a and as illustrated is adjacent the "Create a Document" action. The action is selected in the normal manner by positioning the cursor adjacent the line on the menu and hitting the "enter" key. The system responds with a series of prompts which allows the user to create a document. For purposes of this description it can be assumed that the document is sent to another EU on the system and the author now wants to store the document.

Figure 4B:
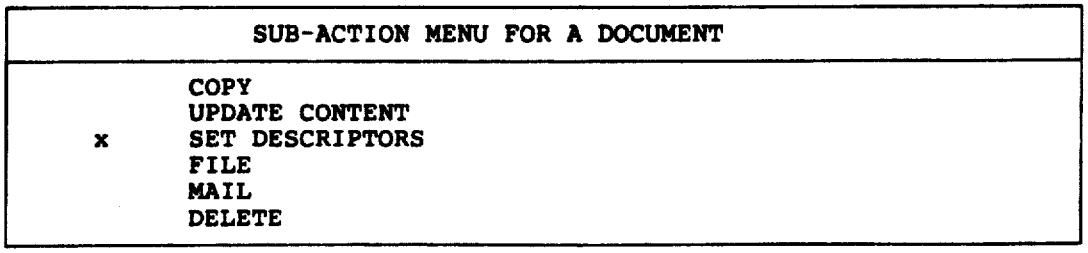
Figure 14A:
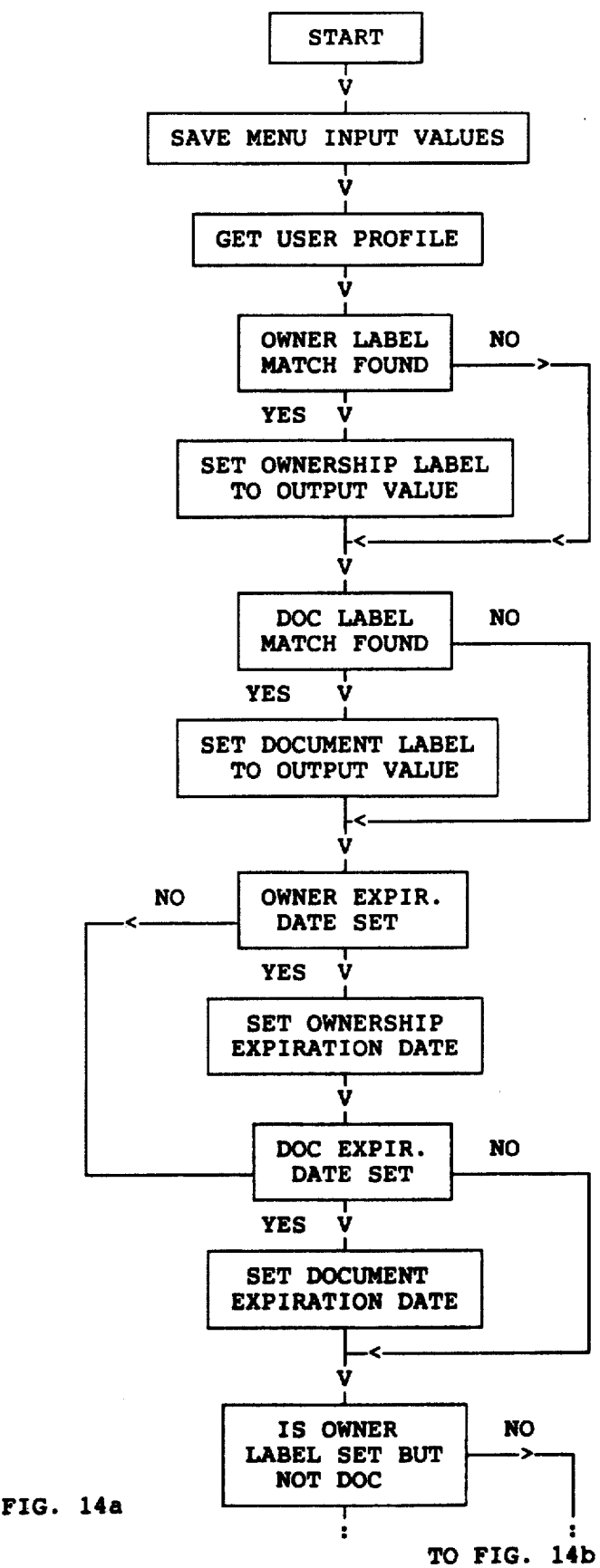
FIGS. 14a through 14d is a flow chart illustrating the various steps of the method of the present invention.
Figure 14B:
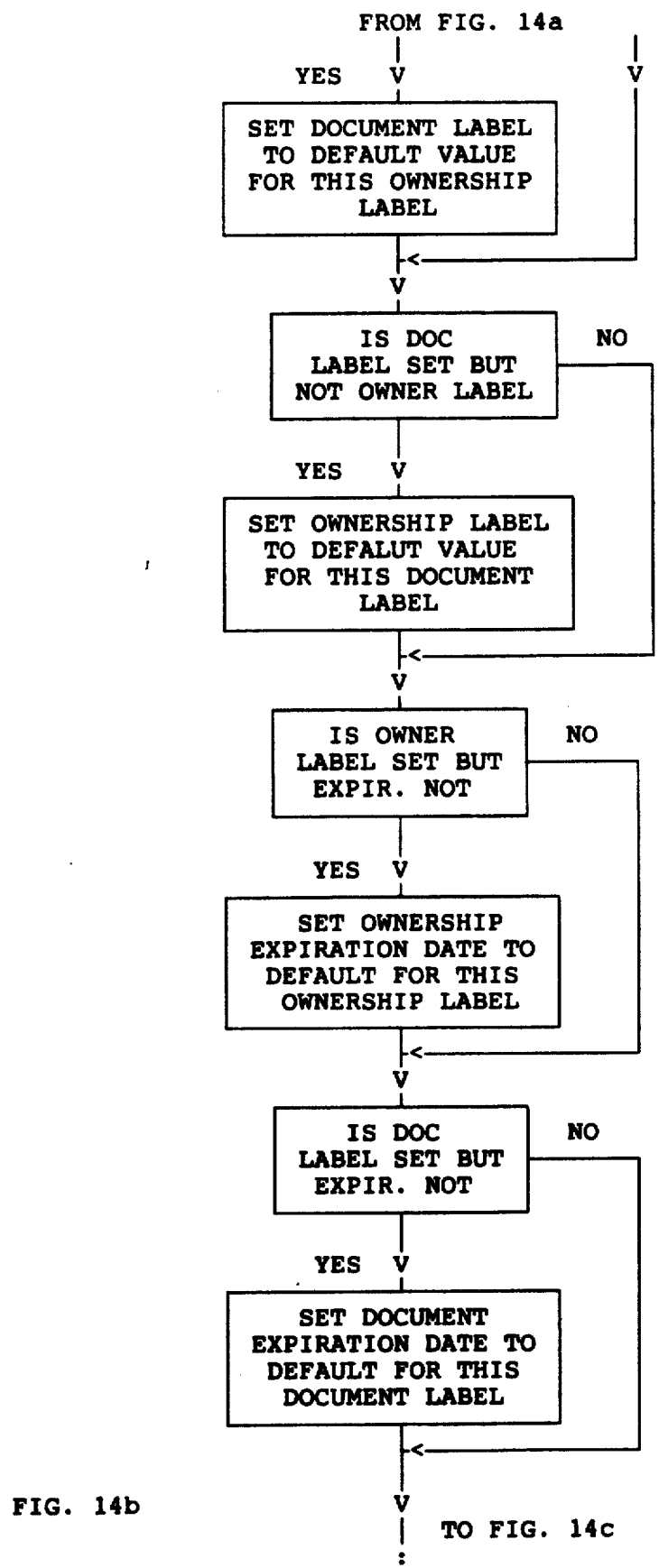
Figure 14C:
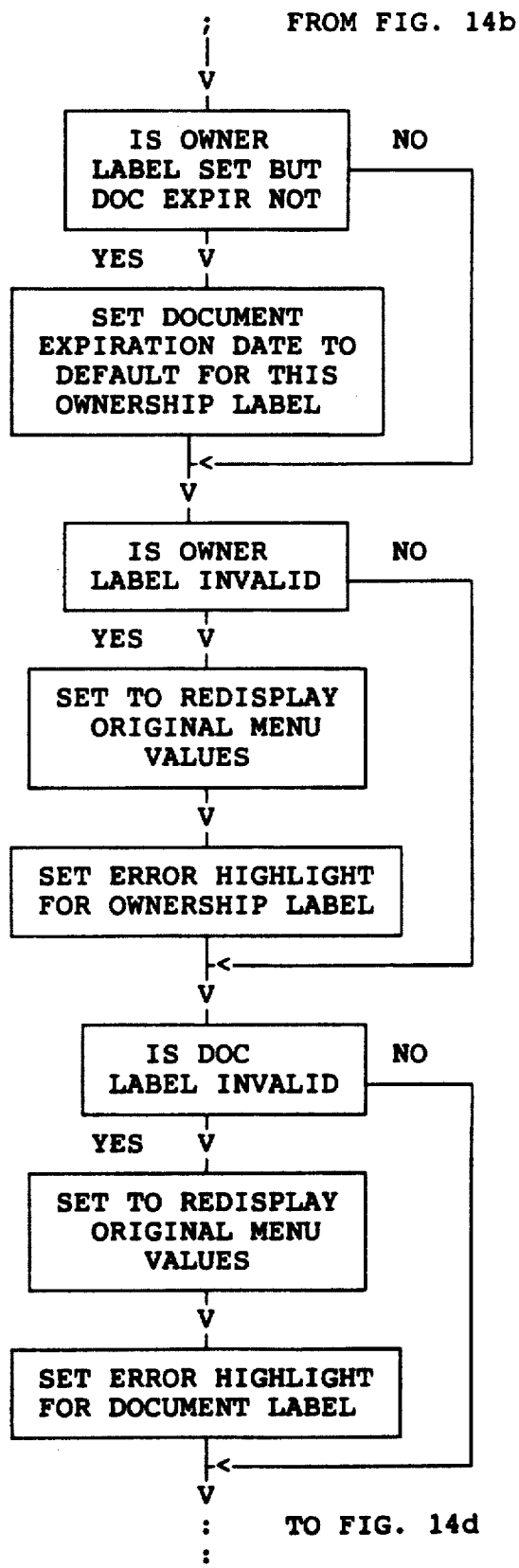
Figure 14D:
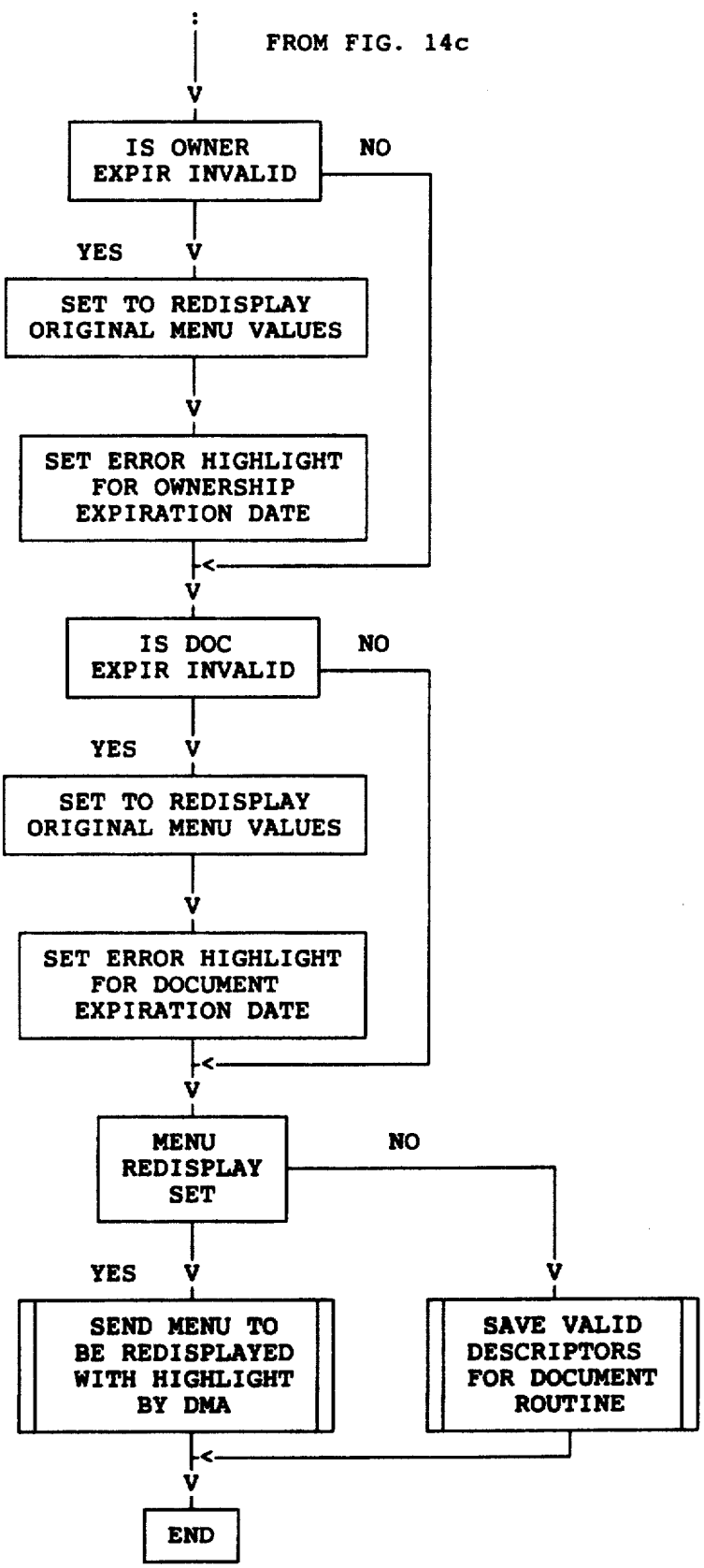

In order to store the document, descriptors must be assigned which assist in controlling the retention of the document up to a specified time and automatic deletion of the document after that time, in accordance with some predetermined strategy. The sub-action menu shown in FIG. 4b, includes an option to "SET DESCRIPTORS" which is selected to enter the criteria that will be used to manage the retention and automatic deletion of documents from the system. When this option is selected the screen shown in FIG. 5 is displayed to the EU. The end user responds to the various prompts displayed in FIG. 5 by entering a name for the document label and a name for the ownership label. It should be assumed for the moment that the respective names have been preestablished. The expiration dates for the document and the ownership may be provided in a number of different ways.

As indicated on the screen of FIG. 5, a list of allowable values can be obtained by placing the cursor under the appropriate field and pressing a predesignated key such as the "HELP" key. The allowable values which have been preestablished then appear in a "window" or on a separate screen which permits the user to copy or just select the choice by positioning the cursor and pressing the "ENTER" key. FIG. 6 illustrates the screen that is provided when the end user places the cursor under the field "DOCUMENT LABEL" in FIG. 5 an presses the HELP key. FIG. 7 illustrates the screen that is provided when the end user places the cursor under the field "OWNERSHIP LABEL" in FIG. 5 and presses the HELP key. The set of allowable ownership labels that are displayed in FIG. 7 are unique to the document label BUDGET. A different set of allowable ownership labels would generally be displayed for a different document label.

It should be noted that the end user has the flexibility to enter in all four criteria manually, or the end user can obtain assistance in selecting an ownership label or a document label. As will be explained in detail later, all data that is entered directly into the system by the end user is verified by the system to insure the integrity of this data. The entry of the criteria data automatically based on one or more criteria that have been entered manually will now be described.

Each end user in the system has a profile that is developed by the end user and the system administrator and which is stored in the system. The profile has the following sections:
1. An ownership label section, illustrated in FIG. 8.
2. A document label section, illustrated in FIG. 9.
3. An ownership expiration date table illustrated in FIG. 10.
4. A document expiration date table illustrated in FIG. 11.
5. A table of rules for calculating expiration dates, illustrated in FIGS. 12a and 12b.

The function of each of these sections and their interrelationships to the other sections and to the process of automatic data entry and verification of manually entered data will now be described.

The ownership label section shown in FIG. 8 comprises four columns: INPUT LABEL; OUTPUT LABEL; DESCRIPTION; and DEFAULT DOCUMENT LABEL.

The INPUT LABEL column lists a set of possible input labels that, a) the end user would possibly enter directly and b) labels approved for use by another end user or used by another system that are assigned to documents that are sent to this end user that will be stored in his system.

The OUTPUT LABEL column includes the set of approved ownership labels that are actually assigned to documents as they are stored. The functional relationship of the two columns is to automatically convert an unapproved ownership label to an approved ownership label. The last two entries cover the situation of miscellaneous labels OTHER and NONE. The OTHER entry is used when a label is entered but no match is found. The NONE entry is used when no label is entered.

The DESCRIPTION column is self explanatory and is used only in the process of creating the profile and as an aid to understanding the labels when a profile is reviewed.

The DEFAULT DOCUMENT LABEL column lists a set of approved document labels for each of the approved ownership labels listed in column two. The function of the default document label is to permit the automatic entry of a document label into the set document descriptors menu shown in FIG. 5 in those situations where the end user has elected for some reason not to enter the data directly.

The document label section shown in FIG. 9 comprises four columns: INPUT LABEL; OUTPUT LABEL; DESCRIPTION; and DEFAULT OWNERSHIP LABEL.

The INPUT LABEL column lists a set of possible input labels that, a) the end user would possibly enter directly and b) labels approved for use by another end user or used by another system that are assigned to documents that are sent to this end user that will be stored in the end user's system.

The OUTPUT LABEL column includes the set of approved document labels that are actually assigned to documents as they are stored. The functional relationship of the two columns is to automatically convert an unapproved document label to an approved document label. The last two entries in the INPUT LABEL column cover the situation of a miscellaneous label OTHER and the situation where the end user did note enter an ownership label.

The DESCRIPTION column is self explanatory and is used only in the process of creating the profile and as an aid to understanding the labels when a profile is reviewed.

The DEFAULT OWNERSHIP LABEL column lists a set of approved ownership labels for each of the approved output document labels listed in column two. The function of the default document label is to permit the automatic entry of an ownership label into the set document descriptors menu shown in FIG. 5 in those situations where the end user has elected for some reason not to enter the data directly.

The ownership expiration date section as shown in FIG. 10 comprises five columns: the OUTPUT OWNERSHIP LABEL column; the MINIMUM column; the MAXIMUM column; the PERMISSIBLE VALUES column; and the DEFAULT column. This section has two functions, namely to verify that an ownership expiration date that was entered directly by the end user is a permissible date value, and to provide a default date in the event that data is not entered directly.

The OUTPUT OWNERSHIP LABEL column contains a set or list of approved ownership labels.

The MINIMUM column contains an entry which indicates a minimum time period that a document containing the label in column 1 must be owned by the end user. The implication is that ownership may be maintained at least until the end of the period specified.

The MAXIMUM column contains an entry which indicates a maximum time period that ownership may be maintained. The implication is that after the stated period, this end user does not have responsibility for the document nor control over it.

The PERMISSIBLE VALUES column contains an entry which indicates the values that may be entered. The implication is that time periods must be expressed in predetermined units, i.e. days, not hours, between the minimum and maximum values set forth in columns 2 and 3.

The DEFAULT column contains an entry for each label in column 1 which indicates the time period that is entered automatically into the set descriptors menu of FIG. 5 when that data is not entered directly by the end user. The time period is converted into an expiration date by the system using the current date as the starting time for the calculation.

The MINIMUM, MAXIMUM and PERMISSIBLE VALUES columns are employed to verify an ownership expiration date that has been entered directly by the end user. The DEFAULT column is employed in the process of automatic data entry when the end user has elected not to enter the expiration date directly. verify The document expiration date section as shown in FIG. 11 comprises five columns: the OUTPUT DOCUMENT LABEL column; the MINIMUM column; the MAXIMUM column; the PERMISSIBLE VALUES column; and the DEFAULT column. This section has two functions, namely to verify that a document expiration date that was entered directly by the end user is a permissible date value, and to provide a default date in the event that data is not entered directly.

The OUTPUT DOCUMENT LABEL column contains a set or list of approved document labels.

The MINIMUM column contains an entry which indicates a minimum time period that a document containing the label in column 1 must be maintained by the system. The implication is that the document will be maintained at least until the end of the period specified.

The MAXIMUM column contains an entry which indicates a maximum time period that the document may be maintained by the system. The implication is that after the stated period, the document may be deleted from the system. nor control over it.

The PERMISSIBLE VALUES column contains an entry for each label which indicates the values that may be entered. The implication is that time periods must be expressed in predetermined units, i.e. days, not hours, between the minimum and maximum values set forth in column 2 and 3.

The DEFAULT column contains an entry for each label in column 1 which indicates the time period that is entered automatically into the set descriptors menu of FIG. 5 when that data is not entered directly by the end user. The time period is converted into an expiration date by the system using the current date as the starting time for the calculation.

The MINIMUM, MAXIMUM and PERMISSIBLE VALUES columns are employed to verify a document expiration date that has been entered directly by the end user. The DEFAULT column is employed in the process of automatic data entry when the end user has elected not to enter the document expiration date directly.

The TABLE OF RULES FOR EXPIRATION DATE CALCULATIONS as shown in FIGS. 12a and 12b comprise two columns: the LABEL column and the RULE column. The labels listed in column 1 of FIG. 12a are approved ownership labels and correspond to the set of labels listed in column 1 of FIG. 10. The Rules are established by the enterprise in accordance with the document retention strategy and reflect the understanding that the document expiration date and the ownership expiration date will generally have a quantifiable relationship for any given document type. The Rule tables of FIGS. 12a and 12b are used to verify that the two expiration dates assigned to the document either directly by the end user or automatically by the system meet the predetermined relationship that has been established by the system.

FIGS. 13a through 13d illustrate the rules for applying defaults for each of the four criteria that is entered into the set descriptors menu of FIG. 5. FIG. 13a sets forth the rules for applying a default ownership label and comprises four columns: the INPUT OWNERSHIP LABEL MATCHES PROFILE column; the INPUT DOCUMENT LABEL MATCHES PROFILE column; the DEFAULT OWNERSHIP LABEL EXISTS column; and the RESULT column. The Rules summarized in the chart are as follows:

1. If the input ownership label entered directly by the end user is a valid input ownership label as listed on the profile of the end user then enter the corresponding output ownership label.

2. If the input ownership label entered is not a valid input ownership label, then the document is not filed. The end user is given a chance to resubmit the request.

3. If under case 2, the file is rejected.

4. If either the ownership label and document label that were entered directly by the end user is invalid, the file is rejected. The end user is given a chance to resubmit the file. The invalid values are highlighted.

Rules similar to rules 1-4 listed above can be articulated from the other default rules tables illustrated in FIGS. 13b, 13c and 13d.

FIG. 14 is an extensive flow chart illustrating the various steps that occur in the method of the present invention to cause the automatic entry and verification of retention and deletion criteria data for each document that is stored in the system. The flow chart is in sufficient detail to permit a person skilled in the art to understand the sequence of steps that are performed for the different scenarios that the end user would encounter. A detailed description of the operation setting forth the steps of the flow chart is therefore considered unnecessary for an understanding of the invention.

The following is a list of pseudocode statements which may be used by a programmer to implement the present invention in a typical electronic document storage system.

FILE DOCUMENT WITH CLASSIFICATION INFORMATION

Called by:
    This routine is called from a routine that interfaces with the End User (EU) or System Administrator (SA) to provide a file document with a specified classification, e.g. business classification.

Input:
    User Profile(s)
    Document definition including,
        Document content Document discriptors including,
   Document Label (DL)
   Ownership Label (OL)
   Expiration period values(s)

PROCESS

If an OL matches an input value in the user profile (1)
   Then, Set the OL for this document to the corresponding OL output value from the user profile (2)
   Endif (Check OL)
If the DL matches an input value in the user profile (3)
   Then, Set the DL for this document to the corresponding DL output value from the user profile (4)
   Endif (Check DL)
If the Ownership Expiration Date is specified
   Then, set the OED as specified
   Endif (OED is specified)
If the Document Expiration Date (DED) is specified
   Then, set the DED specified
   Endif (DED is specified)
If the OL is set and the DL is not set (5)
   Then, set the DL for this document to the corresponding default DL for this OL
   Endif (set DL from OL)
If the DL is set and the OL is not set (6)
   Then, set the OL for this document to the corresponding default OL for this DL
   Endif (set DL from OL)
If the OL is set and the OED is not set (7)
   Then, set the OED for this document to the corresponding default OED for this OL
   Endif (set OED from OL)
If the DL is set and the DED is not set (8)
   Then, set the DED for this document to the corresponding default DED for this DL
   Endif (set DED from OL)
If the OL is set and the DED is not set (9)
   Then, set the DED for this document to the corresponding default DED for this OL
   Endif (set DED from OL)
If the OL is invalid (10)
   Then, setup to redisplay the input area with the original values setup to highlight the invalid OL
   Endif (Invalid OL)
If the DL is invalid (11)
   Then, setup to redisplay the input area with the original values setup to highlight the invalid DL
   Endif (Invalid DL)
If the OED is invalid (12)
   Then, setup to redisplay the input area with the original values setup to highlight the invalid OED
   Endif (Invalid OED)
If the DED is invalid (13)
   Then, setup to redisplay the input area with the original values setup to highlight the invalid DED
   Endif (Invalid DED)

The following comments relate to the numbers at the end of the statements;

(1) The user profile table for the OL can include a "catch all" entry which means "use this entry if the label is specified, but it doesn't match any value explicitly entered into the table." A "null" entry can be specified which means "use this entry if no label is specified".
(2) The output OL can be the same or different value from the input OL.
(3) The DL is processed like the OL. See (1).
(4) The output DL can be the same or different value from the input DL.
(5) The DL can be defaulted by knowing the OL.
(6) The OL can be defaulted by knowing the DL.
(7) The OED can be defaulted by knowing the OL.
(8) The DED can be defaulted by knowing the DL.
(9) The DED can be defaulted by knowing the OL.
(10) If the table is set up so some values are invalid then the user must enter a valid OL.
(11) If the table is set up so some values are invalid then the user must enter a valid DL.
(12) Allowable OEDs depend upon the OL. The DED may be required to have a defined relationship to the OED.
(13) Allowable DEDs depend upon the DL. The DED may be required to have a defined relationship to the OED.

The output of the process is:
A filed document with appropriately set labels and expiration dates, or
A rejected file operation.

While applicant has disclosed and illustrated a preferred embodiment of the improved method, it will be obvious to those persons skilled in the art of electronic document storage, that changes and modifications may be made without departing from the spirit of the invention or the scope of the appended claims.

I claim:

1. A method to select criteria for each of a plurality of electronic documents stored in an interactive information handling system by a plurality of end users, said criteria being assigned to a document to permit said system to manage the automatic retention and deletion of said electronic document, said document being stored in said system with said criteria in response to a command by an end user, each of said end users having an interactive terminal connected to said system that includes a keyboard and a display device for the interactive entry of information into said system, said method comprising the following combination of steps, A) displaying on said device, a screen image to permit said end user to selectively enter a pair of input labels and a pair of expiration dates which are individually related to a different one of said input labels for use by said system in selecting said criteria, B) storing a profile in said system for said end user which includes a pair of sections each having a plurality of approved input entries, each said input entry having,
      (1) a related output label that is assigned to said document as one of said criteria if said corresponding input label is entered, and
      (2) a default output label that is assigned to said document as one of said criteria if the other input label of said pair of input labels is not interactively entered by said user, (C) storing rule data in said system for use in determining if said pair of expiration dates are valid criteria for said document, said rule data including for each said output label,
      (1) minimum and maximum retention periods and a default retention period for use by said system in assigning a default expiration date to said document if an expiration date for said related output label is not entered interactively by said user, and
      (2) a logic equation involving a time comparison between said pair of expiration dates that are related respectively to said pair of output labels corresponding to said input labels, D) entering interactively at least one said input label and one said expiration date, E) converting said one entered input label to a related output label by referencing said profile of said user, F) automatically entering with said system by referencing said profile of said user,
- (1) the default output label for said other label that is associated in said profile with said one entered input label, and
- (2) the default expiration date associated with said automatically entered default output label, said step of automatically entering including the further step of, G) confirming that said time comparison between said expiration dates entered in steps D and F satisfies said logic equation associated with each said output label by referencing said rule data that is stored for each said output label, and H) assigning said expiration dates as said criteria for said document if said equation is satisfied.

2. The method recited in claim 1 including a further step of,
- A) verifying with said system that said one label entered into said system in step d) is valid and identifiable by said system prior to said step of converting.

3. The method recited in claim 2 in which step B) includes the further steps of,
- A) storing in said system said pre-established information including for each said end user a profile comprising,
  - a first set of allowable input ownership labels, and
  - a second set of allowable input document labels, and
- B) said step of verifying includes referencing said one of said sets of allowable input labels.

4. The method recited in claim 3 in which said step of storing said first set includes the step of,
- A) storing in one said section of said profile a plurality of input ownership labels the a designation of which is under the control of said end user and a corresponding plurality of output ownership labels each of which is associated with one of said input ownership labels and the a designation of which is not under the control of said end user.

5. The method recited in claim 4 in which said step of storing in said profile includes a further step of,
- A) storing in said one section of said profile a default output document label for each of said output ownership labels and in which said step of automatically entering includes a further step of,
- B) entering one said default output document label when no input document label is entered during said step of entering interactively.

6. The method recited in claim 5 in which said step of storing in said profile includes a further step of,
- A) storing in the other said section of said profile of said end user a default ownership label for each of said allowable document labels and in which said step of automatically includes a further step of,
- B) entering one said default ownership label when no input ownership label is entered during said step of entering interactively.

7. The method recited in claim 6 in which said step of storing rule data includes the further step of,
- A) storing a default ownership expiration period in association with each of said output ownership labels, and in which said step of automatically entering includes a further step of,
- B) entering a default ownership expiration date based on said default ownership expiration period when an ownership expiration date is not entered during said step of entering interactively.

8. The method recited in claim 7 in which said step of storing rule data includes the further step of,
- A) storing a default document expiration period for each of said output document labels, and in which said step of automatically entering includes the further step of,
- B) entering a default document expiration date based on said default document expiration period when no document expiration date for said output document label is entered during said step of entering interactively.

9. A method to assign a set of required retention and deletion criteria, including a document expiration date and an ownership expiration date, to each of a relatively large number of electronic documents stored by users in a multi-user information handling system, prior to each of said documents being stored in said information handling system, said method comprising the following combination of steps,
- A) interactively entering into said system in association with an identified one of said electronic documents to be stored, input data to cause a subsequent assignment by said system of a set of said required criteria to said identified one document,
- B) storing default criteria in said system which can be automatically entered by said system if said input data does not include a specific criteria,
- C) storing rules in said system that define which said default criteria are to be automatically assigned to said one document when less than all said required criteria of said set are entered interactively, said rules including a logical equation for each different set of criteria specifying a logical time relationship between said expiration dates that must be satisfied before said required criteria can be assigned to said identified document,
- D) selecting said default criteria to be automatically assigned to said one document based on a logical analysis by said system involving the identity of said criteria entered in Step A) and said rules stored in said system, including the further step of verifying with said system that said time relationship between said expiration dates to be assigned to said document satisfies said equation for said set,
- E) automatically assigning with said system, after said time relationship is verified, said default criteria selected in step D) and said at least one entered criteria, to said one identified document including the step of,
  - (1) storing said one identified document in said system in association with said assigned default criteria and said at least one entered criteria, and
- G) managing the retention and deletion of said one identified document with said system in accordance with said expiration dates stored with said document.

10. A method to select document retention and deletion criteria for each of a plurality of electronic documents stored in an interactive information handling system by a plurality of end users to permit said system to manage the automatic retention and deletion of said electronic documents, each of said end users having an interactive terminal connected to said system that includes a keyboard and a display device for the interactive entry of information into said system, said method comprising the following combination of steps,
- A) displaying on said device, a screen image to permit one of said users to interactively enter an input ownership label, an input document label, an ownership expiration date and a document expiration date, for use by said system in managing the retention and deletion of a related document to be stored in said system,
- B) storing a profile in said system for said one user which includes an ownership label section having a plurality of approved input ownership entries and a document label section having a plurality of approved input document entries, each said input ownership entry having,
  - (1) a related output ownership label that is assigned to said document as one of said criteria if said corresponding input ownership entry is entered, and
  - (2) a related default output document label that is assigned to said document as one of said criteria if said corresponding input ownership entry is entered and an input document label is not interactively entered by said user, each said input document entry having,
  - (3) a related output document label that is assigned to said document as one of said criteria if said corresponding input document entry is entered, and
  - (4) a related default output ownership label that is assigned to said document as one of said criteria if said corresponding input document entry is entered and an input ownership label is not interactively entered by said user,
- (C) storing rule data for use by said system in assigning said ownership and document expiration dates to said document, said data including for each said output label,
  - (1) minimum and maximum retention periods and a default retention period for use by said system in assigning said expiration dates to said document if an expiration date is not entered interactively by said user, and
  - (2) valid logical relationship that must exist between said expiration dates when entered interactively by said user,
- D) entering interactively at least one said input label and one said expiration date,
- E) converting said one entered input label to a related output label by referencing said profile of said user,
- F) automatically entering with said system by referencing said profile of said user,
  - (1) the other default output label that is associated with said one entered input label, and
  - (2) the other default expiration date associated with said default output label, Said step of automatically entering including the further step of,
  - (3) confirming that said expiration dates entered in steps D and F have a valid time relationship by referencing said rule data that is stored for each said label, prior to storing said dates as retention and deletion criteria for said document.

* * * * *

UNITED STATES PATENT AND TRADEMARK OFFICE
CERTIFICATE OF CORRECTION

PATENT NO. : 5,107,419

DATED : April 21, 1992

INVENTOR(S) : Margaret G. MacPhail

It is certified that error appears in the above-identified patent and that said Letters Patent is hereby corrected as shown below:

ABSTRACT paragraph, line 19, please delete "data" and substitute therefor --date--;

line 24, please delete "and" (second occurrence) and substitute therefor --any--;

Col. 13, lines 30-32, please delete "in said system said pre-established information including for each said end user a profile comprising,";

Col. 13, line 41, please delete "the";

line 45, please delete "the";

line 61, after "automatically", please insert --entering--;

Col. 16, line 13, please delete "relationship" and insert --relationships--; and line 26, please delete "Said" and substitute therefor --said--.

Signed and Sealed this

Twenty-sixth Day of October, 1993

Attest:

BRUCE LEHMAN

Attesting Officer           Commissioner of Patents and Trademarks